(12) United States Patent
Falvo

(10) Patent No.: US 9,654,539 B2
(45) Date of Patent: *May 16, 2017

(54) MULTI-STREAMING MULTIMEDIA DATA

(71) Applicant: Google Technology Holdings LLC, Mountain View, CA (US)

(72) Inventor: Barry P. Falvo, Eagleville, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,599

(22) Filed: Sep. 21, 2015

(65) Prior Publication Data

US 2016/0014183 A1 Jan. 14, 2016

Related U.S. Application Data

(63) Continuation of application No. 13/691,124, filed on Nov. 30, 2012, now Pat. No. 9,143,543.

(51) Int. Cl.
*G06F 15/16* (2006.01)
*H04L 29/06* (2006.01)
*H04N 21/845* (2011.01)

(52) U.S. Cl.
CPC ........ *H04L 65/608* (2013.01); *H04L 65/4084* (2013.01); *H04L 65/4092* (2013.01); *H04N 21/8456* (2013.01)

(58) Field of Classification Search
CPC .............. H04L 65/4084; H04L 65/608; H04N 21/8456
USPC ........................................ 709/228, 231, 248
See application file for complete search history.

(56) References Cited

U.S. PATENT DOCUMENTS

| | | |
|---|---|---|
| 6,018,768 A | 1/2000 | Ullman et al. |
| 2003/0154492 A1 | 8/2003 | Falvo et al. |
| 2007/0283274 A1 | 12/2007 | Mettifogo |
| 2008/0263219 A1 | 10/2008 | Bacchi et al. |
| 2011/0096828 A1 | 4/2011 | Chen et al. |
| 2012/0137015 A1 | 5/2012 | Sun |
| 2013/0111028 A1 | 5/2013 | Kondrad et al. |
| 2013/0188922 A1 | 7/2013 | Furbeck et al. |
| 2013/0275615 A1 | 10/2013 | Oyman |
| 2013/0282877 A1 | 10/2013 | Keum et al. |
| 2013/0286868 A1 | 10/2013 | Oyman et al. |

FOREIGN PATENT DOCUMENTS

WO    WO 2012030178 A2 *  3/2012  ......... H04L 65/4084

* cited by examiner

*Primary Examiner* — Hieu Hoang
(74) *Attorney, Agent, or Firm* — Fenwick & West LLP

(57) ABSTRACT

A method for multi-streaming multimedia content data over a network to affiliated client devices is provided. A manifest including a list of Universal Resource Indicators (URIs) for different segments of multimedia content data for selected primary multimedia content and a list of URIs for different segments of multimedia content data for at least one alternate multimedia content related to and different from the selected primary multimedia content is built and made available for download over the network with a transfer protocol. Synchronization of display of the selected primary multimedia content on a primary display and display of the at least one alternate content on the at least one auxiliary client device is thereby enabled. A system for streaming multimedia data over a network to affiliated client devices is also disclosed.

14 Claims, 3 Drawing Sheets

MULTI-STREAMING MULTIMEDIA DATA

CROSS REFERENCE TO RELATED APPLICATIONS

This application is a continuation of U.S. application Ser. No. 13/691,124, filed Nov. 30, 2012, now U.S. Pat. No. 9,143,543, which is incorporated by reference in its entirety.

BACKGROUND

Streaming is a technique of delivering data corresponding to media content to end-users and typically involves continuously playing media content as the media data is being streamed or delivered to the end user. The streamed content can correspond to video and/or audio, and an end user may watch the streamed content, for instance, on a television monitor connected to an IP client set-top box as well as other client devices such as tablets, smart-phones, personal and lap-top computers, and like electronic devices having or connected to display screens and/or audio speakers.

Hypertext Transfer Protocol (HTTP) Live Streaming (HLS), Dynamic Adaptive Streaming over HTTP (MPEG DASH), Smooth Streaming (SS), and HTTP-based Dynamic Streaming (HDS) provide examples of techniques for streaming content using HTTP. Incoming media data from a source is segmented or "chunked" into multiple separate media files which are stored on a server. A playlist file or manifest is created that includes Uniform Resource Identifiers (URIs) that direct client devices to the address or location of the media segments or files on the server. When the segmented media files are downloaded by a client device, the media files can be reassembled and played one-by-one by the client device in accordance with order specified in the playlist or manifest file. Thus, the user of the client device can be provided with continuous and uninterrupted playing of the media content while the client device continues to download and reassemble additional chunks or segments of the stream.

Adaptive streaming involves producing several instances of the same source media file and making the files containing identical content available to various different types of client devices depending upon their delivery bandwidth, CPU processing power, or the like. For instance, by monitoring CPU utilization and/or buffer status, adaptive streaming technologies can change streams when necessary to ensure continuous playback and to otherwise improve the viewing experience. Thus, HTTP-based adaptive streaming technologies use a combination of encoded media files and manifest or playlist files that identify alternative streams of identical content and their respective URLs. Client devices monitor buffer status and/or CPU utilization and change streams as necessary by locating an alternate stream of the same content from the URLs specified in the manifest or playlist file.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
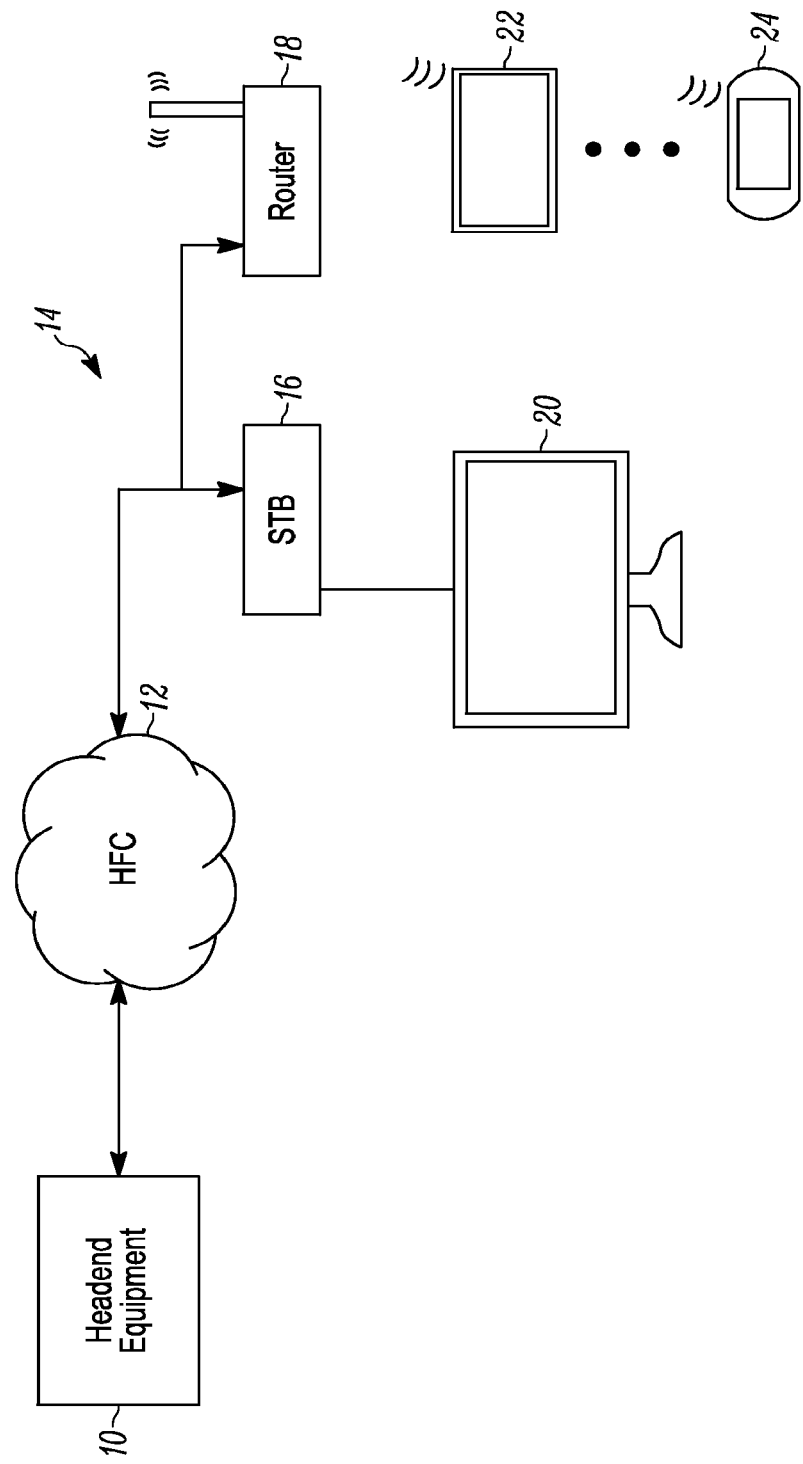
FIG. 1 is a diagram of a possible arrangement of primary and auxiliary client devices on a home or local area network to which content may be streamed from a service provider in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments disclosed herein, methods and systems for multi-streaming multimedia content data over a network to affiliated client devices are provided.

According to one such embodiment, a method of streaming multimedia data over a network comprises a step of building a manifest including a list of Universal Resource Indicators (URIs) for different segments of multimedia data for selected primary multimedia content and a list of URIs for different segments of multimedia data for at least one alternate multimedia content related to and different from the selected primary multimedia content and a step of making the manifest available for download by a primary client device over the network with a transfer protocol.

According to another aspect of this embodiment, a method of streaming multimedia data over a network to affiliated client devices comprises a step of downloading a manifest with a primary client device over the network with a transfer protocol, the manifest including a list of Universal Resource Indicators (URIs) for different segments of multimedia data for a selected primary multimedia content and a list of URIs for different segments of multimedia data for at least one alternate content related to the selected primary multimedia content, and a step of downloading the manifest with at least one auxiliary client device affiliated with the primary client device over the network with a transfer protocol to enable synchronization of display of the selected primary multimedia content on a primary display controlled by the primary client device and display of the at least one alternate content on the at least one auxiliary client device.

According to a further aspect of this embodiment, a system for streaming multimedia data over a network to affiliated client devices includes a multi-stream playlist rebuilder and an alternate content coordination manager. The multi-stream playlist rebuilder is configured to receive a manifest including a list of Universal Resource Indicators (URIs) for different segments of multimedia data for a selected primary multimedia presentation, and the alternate content coordination manager is configured to provide the multi-stream playlist rebuilder with a list of URIs for different segments of multimedia data for at least one alternate multimedia content that is related to and different from the selected primary multimedia presentation. The multi-stream playlist rebuilder is also configured to generate a modified manifest including the list of URIs for the different segments of the multimedia data for the selected primary multimedia presentation and a list of URIs for the different segments of the multimedia data for the at least one alternate multimedia content.

Accordingly, methods and apparatus are provided for delivering synchronized content to multiple client devices in a coordinated manner (i.e. multi-streaming of primary and alternate contents to different client devices for playing and viewing simultaneously on the multiple client devices). For example, the synchronized content may include primary media content for display on a primary display screen and related alternate media content or contents for display on affiliated secondary or auxiliary display screens. The ability of a single subscriber to consume primary and alternate contents in a coordinated manner at the subscriber site is enabled via the use of various types of client devices that can process web content, multimedia content, video and data, and like content via streaming techniques. Accordingly, multimedia content delivery is accomplished to a multitude of client devices, including different types of client devices having different capabilities, and can be provided in the form of a suite of related content.

As one example of a streaming protocol, MPEG-DASH may be used to deliver multimedia content using an XML based playlist that has been modified or rebuilt to provide access to a multitude of time-synchronized multimedia streams accessible by client devices using HTTP. According to an embodiment, MPEG-DASH is utilized in a manner by which alternate contents are delivered to disparate client devices. In this manner, multi-streaming of alternate content effectively forms a Meta layer above dynamic adaptive streaming. While MPEG-DASH has been designed for adapting a single source of content to a multitude of client devices, a multi-streaming embodiment disclosed herein adapts multiple sources of content for delivery to client devices and can be used to provide specific complementary content to targeted receiving client devices.

Multi-streaming can be provided by manipulating adaptive bit-rate stream playlists (e.g., the manifest defined by HLS and MPEG-DASH) in combination with distributing alternate content to multiple auxiliary IP client devices thereby providing a coordinated and synchronized multi-streaming arrangement. For instance, multi-streaming may be used to deliver targeted advertisement content, complementary video content such as alternate viewing angles, alternate multimedia content such as text, web content, slide shows or mini-video segments that might complement the primary content, and many other types of content.

FIG. 1 shows an arrangement for displaying synchronized content to an end user, such as a subscriber of a service. The arrangement in FIG. 1 is merely provided for purposes of example and various other arrangements using other communication devices and protocols may be used. In FIG. 1, synchronized media content is available from a headend 10 of a network 12, such as a hybrid fiber optic-coaxial cable network (HFC), to customer premise equipment (CPE) at a subscriber site. In this example, the subscriber has a home or local area network 14 to which an IP client set-top box 16 and wireless router 18 are connected. The set-top box 16 is connected to a television 20, and the router 18 communicates with multiple other client devices via wireless communications on the home network 14, such as a tablet client device 22 and a smartphone client device 24. Of course, any type of client device can be utilized via the home network 14 in this example, such as computers, personal computers, laptop computers, e-book reader, game pads, remote controllers, and like client devices, and the network is not limited to a cable network and can be any content distribution network (CDN).

It will be understood by a person having ordinary skill in the art that the conventional term "set-top box" should not be construed to limit the physical placement or configuration of such a device; for example, the set-top box 16 in FIG. 1 is neither limited to a device that is enclosed in a box, nor is it limited to a device positioned on top of a television set.

Media content which may be considered primary content may be consumed by the end user via the primary video viewing device, such as provided by the relatively large-screen television 20 in FIG. 1. At the same time, related alternate media content may also be consumed by the end user in a synchronized manner with the primary media content via use of any of a family of affiliated auxiliary client devices, such as tablet 22 and smartphone 24 shown in FIG. 1. There is no limit to the types of media content, the number of alternate media contents, or the types or number of auxiliary client devices affiliated with a subscriber. As one simple example, a baseball game may be shown on the primary video viewing device while video from alternate view points, related replays, statistics, score board, rules of the game, or supplementary information are simultaneously displayed on affiliated auxiliary client devices.

As a means for providing the related synchronized media content to the end user, a HTTP-based adaptive streaming technique is utilized. As discussed above, such techniques essentially include two components: the segmented and encoded audio/video (A/V) streams; and the playlist or manifest files that identify the streams for the client devices and contain their addresses. The related synchronized media content can be provided to an end user by manipulating and modifying or rebuilding the playlist or manifest file corresponding to the primary content such that it also includes the alternate video contents targeted to auxiliary client devices.

The auxiliary client device, such as tablet 22 and smartphone 24 in FIG. 1, download, obtain, or fetch the same manifest or playlist file that is also being used by the primary video viewing device (set-top box 16 and television 20 in FIG. 1). For this purpose, the auxiliary client devices are first provided with information concerning markers, keys, triggers or filters that permit the auxiliary client devices to process only a part of the manifest or playlist that is intended or applicable to that particular device (e.g., web data or multimedia content produced for tablet consumption, or for smartphone consumption, or for any other IP device). In this manner, multiple receiving client devices tune in to or download the same manifest or playlist, but only act on a portion of the manifest or playlist that describes the content that is destined for them. For example, manifest or playlist metadata can provide and include markers that would dynamically trigger behavior in the various receiving IP client devices that have been pre-set to look for a particular marker. Accordingly, a first alternate content marked with a first pre-determined marker may be intended for viewing on tablet client devices while a second alternate content marked with a second pre-determined marker may be intended for viewing on smartphone client devices.

By creating, modifying or rebuilding the playlist or manifest originally intended solely for adaptive streaming of the primary content alone to also include URIs for different related alternate media content, the affiliated auxiliary client devices are able to tune in to the same content title being consumed by the primary video viewing device and simultaneously use the same manifest or playlist being used by the primary video viewing device. This enables the numerous affiliated auxiliary client devices to readily stay in-sync with the primary content with respect to playing of the various related streams. For instance, an alternate viewing angle being displayed on an auxiliary client device would be synchronized in time with the primary viewing angle being displayed on the primary viewing device.

In addition, consumption of the various contents can require authentication and access control mechanisms to ensure that only client devices associated with a particular subscriber's account are being permitted access to the multi-stream playlist. Thus, the service provider is able to retain control over which subscribers and which subscriber's devices the suite of content may be viewed. In the above described manner, a means to deliver coordinated content to a multitude of pre-registered and authenticated affiliated client devices in a synchronized fashion is provided.

Figure 2:
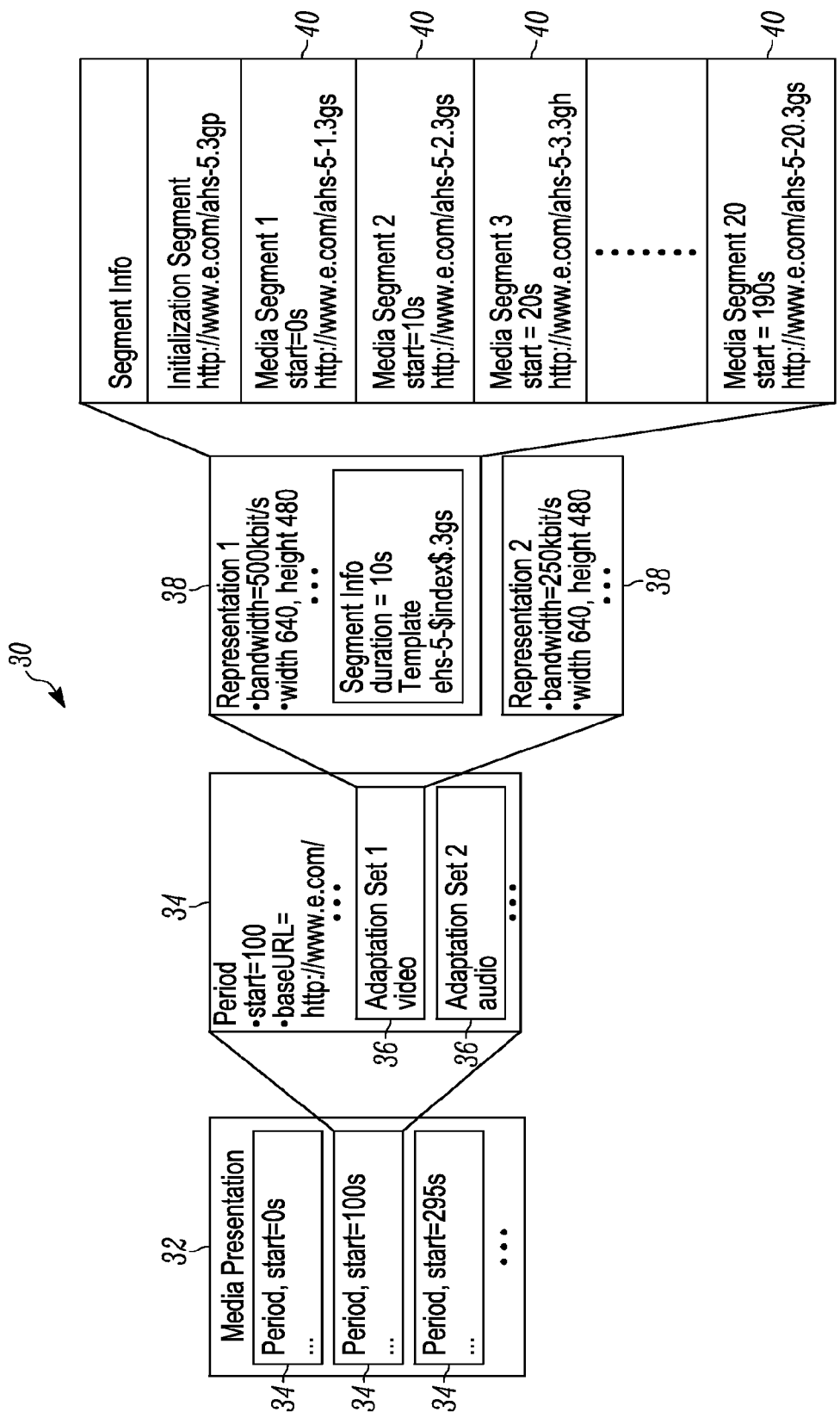
FIG. 2 is an example of a structure of a Media Presentation Description (MPD) manifest file that lists a collection of audio and video content and that incorporates periods, adaptation sets, representations and segments in accordance with an embodiment.

For purposes of example, MPEG-DASH provides a streaming technique that can be used in an embodiment. Other HTTP-based streaming techniques, such as HLS, SS and HDS, may also be utilized. For DASH, the actual A/V streams are referred to as the Media Presentation and the manifest file is referred to as the Media Presentation Description (MPD). By way of example, FIG. 2 shows the structure of a MPD 30 having a Media Presentation 32 with a collection of structured audio/video content that incorporates "periods" 34, "adaptation sets" 36, "representations" 38, and "segments" 40.

The media presentation 32 defines the video sequence with one or more consecutive periods 34 that segment or chunk the video from start to finish. Each period 34 contains multiple adaptation sets 36 that contain the content that comprises the audio/video experience. Each adaptation set 36 contains multiple representations 38, each being a single stream in the adaptive streaming experience. In FIG. 2, "Representation 1" provides 640×480 image resolution at a bit rate of 500 Kbps, and "Representation 2" provides the same image resolution, 640×480, but at a lower bit rate, 250 Kbps. Each representation 38 is divided into media segments 40 which are chunks of data presented in discrete files (such as Media Segment 1, Media Segment 2, Media Segment 3 . . . Media Segment 20 shown in FIG. 2) or as byte ranges in a single media file.

The DASH manifest file (i.e., the Media Presentation Description) 30 is an XML file that identifies the various content components and the location of all alternative streams. In an embodiment, MPD syntax is used as a mechanism to describe relationships between different related streams thereby enabling a set of related, but different, content to be consumed in parallel by a registered subscriber. This enables the affiliated client devices to identify and start playback of the initial segments 40 simultaneously, switch between representations 38 as necessary to adapt to changing CPU and buffer status, and change adaptation sets 36 to respond to user input.

In the embodiments disclosed herein, the MPD is the common point of synchronization across the multiple client devices presenting related, synchronized and coordinated content at a subscriber location. By way of an example, a user may be viewing a sporting event on a primary display, such as a television, while using a tablet client device as an affiliated secondary or auxiliary display. The tablet client device may select to display alternate views showing instant replays, statistics, or the like. The alternate content streams can be described in the MPD 30 in separate adaptation sets 36. Also, since the MPD is constructed with respect to a common timeline, events such as advertisement breaks can be reflected in a synchronized manner on all participating affiliated client devices. This also enables different or coordinated advertisements to be simultaneously displayed on multiple participating client devices during such breaks.

Figure 3:
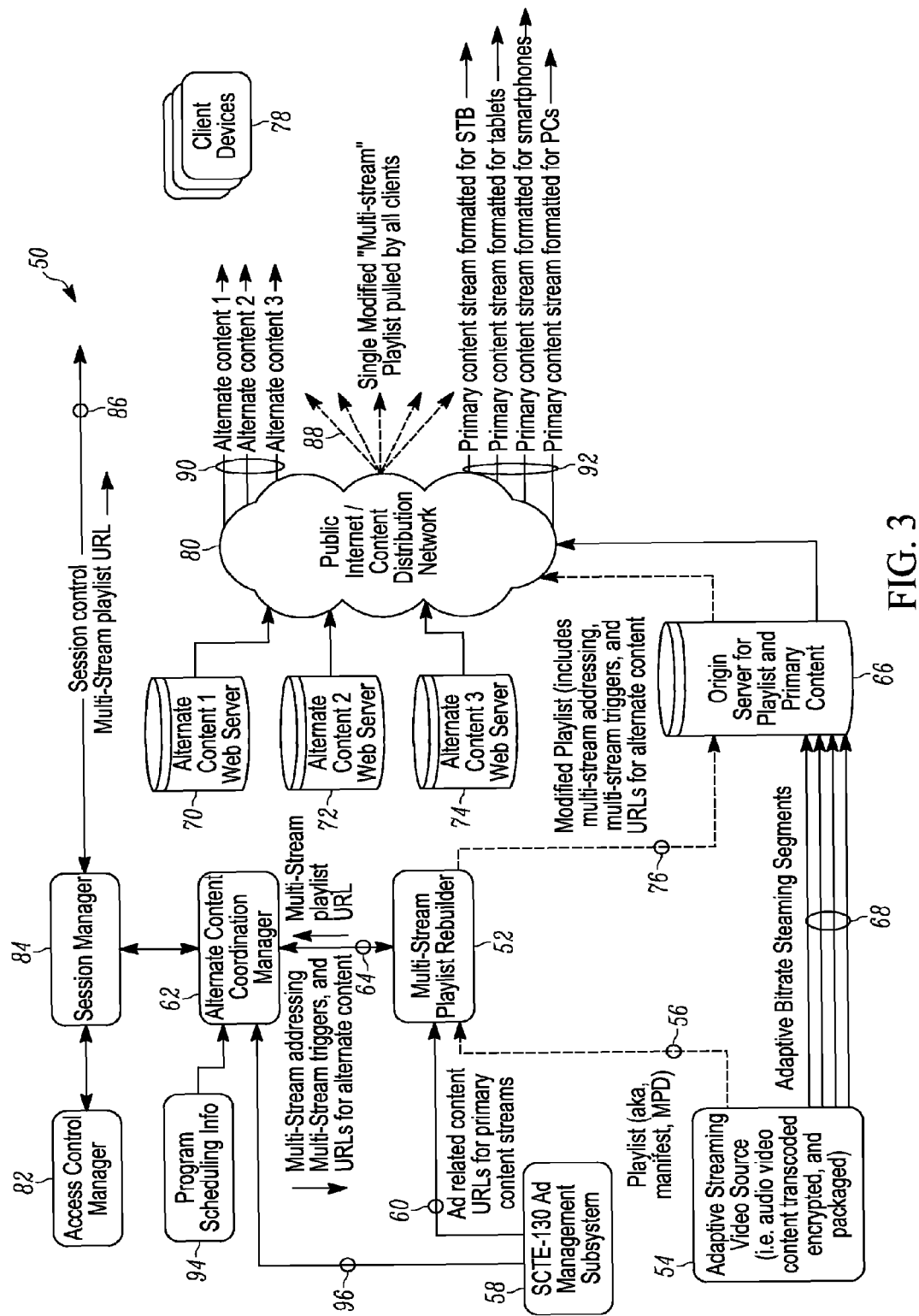
FIG. 3 is a diagram of a system for multi-streaming related primary and alternate contents over a network to affiliated client devices in accordance with an embodiment.

FIG. 3 is a diagram illustrating an embodiment of components of a system 50 that can build a multi-stream playlist and make primary content and related alternate contents available to a subscriber of a multi-stream playlist. The multi-streaming content delivery system 50 includes a multi-stream playlist builder or rebuilder 52 receiving and building a multi-stream playlist or manifest (i.e., a MPD) from information provided by an Adaptive Streaming Video Source 54 (see communication link 56), an Advertisement Related Content Source 58 (see communication link 60), and an Alternate Content Coordination Manager 62 (see communication link 64).

The adaptive streaming video source 54 provides a source of audio and video content for the primary content that has been transcoded, encrypted and packaged. Thus, the adaptive streaming video source 54 provides a playlist, manifest or MPD created for the primary content to the rebuilder 52. In addition, the adaptive streaming video source 54 may also provide the playlist or manifest and the adaptive bit stream media files to a streaming server 66 via a communication link 68. In this manner, subscribers not registered for the multi-streaming service are still able to receive adaptive streaming of the primary content by itself without the ability to obtain the alternate content.

The advertisement related content source 58 (i.e., the SCTE-130 Ad management subsystem) provides the rebuilder 52 with URIs for advertisement related content for being spliced into the playlist for the primary content.

The alternate content coordination manager 62 provides addressing information, markers, triggers, keys or filters for each of the different alternate contents and URIs for the segments or media files of the alternate contents to the rebuilder 52. The alternate content coordination manager 62 may receive input from a program scheduling information unit 94 so that the alternate content coordination manager 62 is given access and information to program scheduling information. In this manner, the alternate content coordination manager 62 can determine the types of alternate content that may be appropriate at any given time. In addition, the alternate content coordination manager 62 may be configured to act off of SCTE-35 ad avail markers that exist in the video transport stream or may similarly react to a related identifier that might be inserted into the stream by the SCTE-130 Ad management subsystem 54. Thus, a communication link 96 enables communications between the alternate content coordination manager 62 and the SCT-130 Ad management subsystem 54.

More specifically, the alternate content coordination manager 62 function can be tightly integrated with the Ad management subsystem 58 via link 96 so that alternate content markers can be inserted into the video transport stream in a similar manner with respect to advertisements spliced into the playlist for the primary content. In such a system, video streams include SCTE-35 ad placement markers, also referred to as ad avails, and transcoders can be configured to detect these markers. In traditional video systems, these markers indicate where ads can be spliced into the stream. In an ABR system functioning according to SCTE-130, the transcoder communicates these markers to the ad management subsystem (in SCTE-130 terms, a Placement Opportunity Information Service (POIS)). The POIS responds with an identifier that the transcoder inserts into the stream, and the identifier is ultimately communicated back into the ad management subsystem downstream by a playlist re-builder and/or by the end client. When communicated back to the ad subsystem, the ad subsystem recognizes the identifier, communicates with other internal functions such as a campaign manager, and may also use additional information it may receive from the playlist re-builder (e.g., ad zone for the client) and will respond with the appropriate ad information that the playlist re-builder folds into the playlist (i.e., manifest).

Accordingly, the Ad management subsystem 58 shown in FIG. 3 can be configured to include alternate content references for the ads (using the same paradigm as ads for the primary content). In this manner, the primary client may cause a commercial concerning a particular make of automobile to be displayed on the primary display screen, and a secondary tablet device may be simultaneously directed to a URL for the web site of an automobile dealer or manufacturer corresponding to the make of automobile shown on the primary display screen.

The rebuilder 52 takes the information provided from the adaptive streaming video source 54, the advertisement related content source 58, and the alternate content coordination manager 62 and generates a modified playlist, also referred to as the multi-stream playlist, which includes the URIs needed for downloading and playing of the primary content with or without advertisement URIs spliced therein and addressing, triggers and URIs for each of the alternate contents. The segments or media files for the alternate contents may be stored on the streaming server 66 or may be stored and made available on other servers such as web servers 70, 72 and 74 shown in FIG. 3.

The modified playlist generated by the rebuilder 52 can be forwarded to the streaming server 66 via a communication link 76 and stored and made available to client devices 78 located at a subscriber site. The streaming server 66 can make the various playlists for all the contents available over the content distribution network 80 which may be the Internet or a service provider network, such as a HFC network.

The system 50 can also include an Access Control Manager 82 and a Session Manager 84 for purposes of providing authentication and access control mechanisms to ensure that only client devices 78 associated with a particular subscriber's account are permitted access to the modified or multi-stream playlist from the streaming server 66. For instance, an auxiliary client device such as a tablet may need to download and activate an application and register with the access control manager 82 and/or session manager 84 before being permitted to tune in to or download a particular modified playlist and be provided with channel guide information and the like regarding the multi-stream service.

The client device 78 may also need to be authenticated by the access control manager 82 each time the client device 78 tunes in to or downloads the modified playlist. The session manager 84 also may seek to recognize the subscriber and the type of auxiliary client device (i.e., tablet, personal computer, smartphone, etc.). Provided the subscriber and client device are registered, recognized and authenticated to receive the multi-stream service, the session manager 84 may provide a particular type of auxiliary client device with a particular marker, key, trigger or filter associated with a particular alternate content. All the above communications can be accomplished over an Internet connection such as link 86 shown in FIG. 3.

Accordingly, when a primary client device downloads the multi-stream playlist, manifest or MPD, the primary content may be consumed on a primary display. The other auxiliary client devices may also download the multi-stream playlist to display alternate content synchronized with the display of the primary content. Thus, as shown in FIG. 3, each of the affiliated client devices (primary and auxiliary) may pull or fetch the multi-stream playlist as shown by arrows 88 in FIG. 3 over the network using HTTP fetches or gets or other transfer protocol.

As discussed above, after authentication with the session manager 84, each of the auxiliary client devices 78 can tune in to or download the modified playlist and use the marker, trigger, key or filter provided to it by the session manager 84 to obtain from the modified playlist the particular URIs for the alternate media content intended for the particular type of auxiliary client device. Thereafter, the auxiliary client device 78 uses these URIs to download and buffer the alternate content, such as from alternate content web servers 70, 72 or 74 via the content distribution network 80 (see arrows 90 in FIG. 3). Thus, one of the alternate contents can be played on each of the auxiliary client devices 78 in a highly coordinated and synchronized manner with the primary content. This also includes synchronization of advertisement breaks as discussed above. As an alternative, if a subscriber is not registered for a particular multi-stream service, the subscriber may be able to stream the primary content in an adaptive manner as shown by arrows 92 in FIG. 3 so that the same primary content can be viewed on any of a variety of different client devices.

Accordingly, as shown in FIG. 3, the delivery system 50 can be used to provide the primary content to any type of client device via an adaptive streaming technique. The delivery system can also provide registration and authentication of auxiliary client devices for receiving a multi-streaming service. If the auxiliary client device is recognized as a subscriber for the service, the auxiliary client device is able to tune in to or fetch the single modified playlist file that is synchronized with the primary content playing on a primary video display. The auxiliary devices can fetch media files for the alternate content appropriate or selected for the auxiliary client device and play the alternate content in a manner substantially synchronized and coordinated with the playing of the primary content. Different auxiliary client devices and/or different types of auxiliary client devices can substantially simultaneously obtain the same modified playlist and use the triggers provided by the session manager to filter out the URIs for media files of alternate contents destined for the particular client devices. Thus, multiple auxiliary contents may be played in a synchronized, coordinated manner with the primary content.

With respect to synchronization, a typical manifest might represent a total duration of about 30 seconds, e.g., three 10 second video segments, and at any given time, a couple of manifests may exist on a web server. For instance, in a single client scenario, the client downloads a manifest and that particular manifest may remain on the web server for a finite amount of time along with one or more additional manifests representing the next, or next several, 30 second intervals of video segments in sequence and so forth. Thus, when considering a multi-client scenario, each client device may request, fetch, download, etc. a manifest at slightly offset times and may potentially be operating on different manifests. In addition, even if all client devices are working off the same manifest, there is no way to ensure that they will be perfectly in sync such that they are all on the time period associated within the same segment. For some content, such a minor offset may not pose a problem, and the client devices will be sufficiently synchronized. However, for related content where tighter synchronization is required, synchronization may be improved in a manner discussed below.

One approach for improving synchronization is to require the primary client device to periodically report its state (e.g., I'm currently rendering segment x) to the session manager 84, and then have the session manager 84, in turn, communicate this state to all of the subscriber's registered secondary client devices. As an alternate approach, the session manager 84 can be configured to infer the state of the primary client device and communicate the inferred state to the subscriber's registered secondary client devices. Yet another approach to improve synchronization is to tighten (i.e., reduce) the time period that a given manifest is permitted to remain available for download on a web server.

Thus, the system 50 enables a service provider to deliver value-add, coordinated services to a multitude of affiliated subscriber devices in a coordinated fashion and enables the service provider to provide suites of value-add content to consumers in a creative manner.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

In addition, the above referenced devices, servers, components, sources, equipment, boxes, tuners, units and the like for carrying out the above methods can physically be provided on a circuit board or within another electronic device and can include various processors, microprocessors, controllers, chips, disk drives, and the like. It will be apparent to one of ordinary skill in the art that the processors, controllers, tuners, units, managers, rebuilders, and the like may be implemented as electronic components, software, hardware or a combination of hardware and software.

One of ordinary skill in the art appreciates that various modifications and changes can be made without departing from the scope of these embodiments as defined in the appended claims.

I claim:

1. A method comprising:
generating a manifest for primary multimedia content and alternate multimedia content related to and different from the primary multimedia content, the primary multimedia content comprising segments of multimedia content data and the alternate multimedia content comprising different segments of multimedia content data, the manifest including a list of identifiers for the segments and a list of identifiers for the different segments, the generating comprising modifying an initial manifest generated for the primary multimedia content by splicing the list of identifiers for the different segments into the initial manifest to produce a modified manifest for multi-streaming the primary multimedia content on a primary client device and the alternate multimedia content on an auxiliary client device affiliated with the primary client device; and
providing the manifest to the primary client device, and the auxiliary client device, the manifest comprising a marker for triggering the auxiliary client device to obtain and play the at least one alternate multimedia content in synchronization with the primary multimedia content.

2. The method of claim 1, wherein providing the manifest to the primary client and the auxiliary client comprises making the manifest available for download over a network with a transfer protocol.

3. The method of claim 2, wherein the transfer protocol is Hyper-Text Transfer Protocol (HTTP)-based streaming.

4. The method of claim 1, wherein the auxiliary client device is one of a tablet, a personal computer, a laptop computer, a smartphone, an e-book reader, or a portable electronic device having an associated display screen, and a different marker is used for each different type of device.

5. The method of claim 1, further comprising the step of transmitting the manifest to a subscriber site so that the alternate multimedia content is available to the auxiliary client device.

6. The method of claim 1, further comprising the steps of authenticating the auxiliary client device and transmitting information of the marker to the auxiliary client device after the authenticating step.

7. A system comprising:
a processor;
a multi-stream playlist rebuilder executed by the processor and configured to generate a manifest for primary multimedia content and alternate multimedia content related to and different from the primary multimedia content, the primary multimedia content comprising segments of multimedia content data and the alternate multimedia content comprising different segments of multimedia content data, the manifest including a list of identifiers for the segments and a list of identifiers for the different segments the generating comprising modifying an initial manifest generated for the primary multimedia content by splicing the list of identifiers for the different segments into the initial manifest to produce a modified manifest for multi-streaming the primary multimedia content on a primary client device and the alternate multimedia content on an auxiliary client device affiliated with the primary client device in a synchronized manner; and
a session manager executed by the processor and configured to provide the manifest to the primary client device and the auxiliary client device affiliated with the primary client device, the manifest comprising a marker for triggering the auxiliary client device to obtain and play the at least one alternate multimedia content.

8. The system of claim 7, wherein the alternate content coordination manager is further configured to receive program scheduling information from a program scheduling information unit.

9. The system of claim 8, wherein the alternate content coordination manager is further configured to determine the alternate multimedia content from a plurality of alternate media content items based on the program scheduling information.

10. The system of claim 7, wherein the manifest is transmitted over the network with Dynamic Adaptive Streaming over HTTP (MPEG DASH), and wherein the manifest is a Media Presentation Description (MPD), and wherein the list of identifiers for the segments of the multimedia content data for the selected primary multimedia presentation and the list of identifiers for the segments of the multimedia content data for the at least one alternate content are provided in separate adaptation sets within the MPD.

11. The system of claim 7, wherein the session manager is further configured to authenticate the auxiliary client device and transmit the marker to the auxiliary client device occurs after the authenticating step.

12. The system of claim 7, wherein the auxiliary client device is one of a set-top box, a tablet, a personal computer, a laptop computer, a smartphone, an e-book reader, and a portable electronic device having an associated display screen, and wherein a different marker is used for each different type of device.

13. The system of claim 7, further comprising at least one server on which the manifest, the different segments of the multimedia content data for the selected primary multimedia presentation, and the different segments of the multimedia content data for the at least one alternate multimedia content is stored and made available to the affiliated client devices via a content distribution network.

14. A method comprising:
  providing, by a content delivery system, primary content for presentation on a primary client device, the primary content comprising primary segments of multimedia content data;
  receiving, at the content delivery system, a request for auxiliary content for synchronized presentation on an auxiliary client device, the auxiliary content related to the primary content and comprising one or more auxiliary segments of multimedia content data, each of the auxiliary segments associated with one of the primary segments;
  generating, at the content delivery system, a multi-stream playlist including identifiers for the primary and auxiliary segments, the multi-stream playlist further including references between associated primary and auxiliary segments;
  providing the manifest to the auxiliary client device;
  receiving, from the auxiliary client device, a request for an auxiliary segment; and
  providing the auxiliary segment to the auxiliary client device for synchronized presentation with the associated primary segment.

\* \* \* \* \*